(12) United States Patent
Tautz et al.

(10) Patent No.: US 9,920,470 B2
(45) Date of Patent: Mar. 20, 2018

(54) METHOD FOR CAPTURING AN ITEM OF LAUNDRY

(71) Applicant: Herbert Kannegiesser GmbH, Vlotho (DE)

(72) Inventors: Frank Tautz, Rahden (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 0 days.

(21) Appl. No.: 14/636,578

(22) Filed: Mar. 3, 2015

(65) Prior Publication Data
US 2015/0292142 A1    Oct. 15, 2015

(30) Foreign Application Priority Data
Apr. 11, 2014   (DE) .................. 10 2014 005 355

(51) Int. Cl.
*D06F 95/00*   (2006.01)
*B25J 11/00*   (2006.01)
*D06F 93/00*   (2006.01)

(52) U.S. Cl.
CPC .............. *D06F 95/00* (2013.01); *B25J 11/00* (2013.01); *D06F 93/00* (2013.01)

(58) Field of Classification Search
CPC ........ D06F 93/00; D06F 93/005; D06F 95/00; B25J 11/00
See application file for complete search history.

(56) References Cited

U.S. PATENT DOCUMENTS

| 2009/0266749 A1* | 10/2009 | Heinz ................ D06F 93/00 209/580 |
| 2010/0087955 A1* | 4/2010 | Tsusaka ............ B25J 9/0003 700/245 |
| 2013/0338826 A1* | 12/2013 | Lukka ............... G06T 7/004 700/245 |

FOREIGN PATENT DOCUMENTS

| DE | 102008028120 A1 | 12/2009 |
| DE | 102011075078 A1 | 11/2012 |
| EP | 2113606 A2 | 11/2009 |
| EP | 2159318 A1 | 3/2010 |
| EP | 2444544 A2 | 4/2012 |
| GB | 1556077 A | 11/1979 |
| WO | 1997049062 A1 | 12/1997 |

OTHER PUBLICATIONS

European Patent Office, Europaischer Recherchenbericht (patent search in related application), Sep. 3, 2015.

* cited by examiner

*Primary Examiner* — Adam R Mott
(74) *Attorney, Agent, or Firm* — Laurence P. Colton; Smith Tempel Blaha LLC (57) ABSTRACT

A method for capturing an item of laundry in a reliable and efficient manner. Washed items of laundry usually leave a washing machine intertwined with one another as a pile of laundry. Before the items of laundry that come out of a washing machine in this way are subjected to further treatment steps, for example mangling or sorting, they have to be separated. In the method, the topography of the item of laundry is ascertained and at least one point of the item of laundry at which the item of laundry is intended to be captured and/or preferably can be captured by a capturing means is determined on the basis of this topography. The item of laundry is captured by the capturing means by specific control of the capturing means at this point.

17 Claims, 4 Drawing Sheets

METHOD FOR CAPTURING AN ITEM OF LAUNDRY

STATEMENT OF RELATED APPLICATIONS

This application claims the benefit of and priority on German Patent Application No. DE 10 2014 005 355.5 having a filing date of 11 Apr. 2014

BACKGROUND OF THE INVENTION

Technical Field

The invention relates to a method for capturing an item of laundry, wherein a point of the item of laundry is grabbed or drawn by suction by a capturing means and is transported away by the capturing means.

Prior Art

Washed items of laundry usually leave a washing machine intertwined with one another as a pile of laundry. Before the items of laundry which come out of a washing machine in this way are subjected to further treatment steps, for example mangling or sorting, they have to be separated. Particularly because the further treatment steps for the washed items of laundry can vary depending on the type of item of laundry, it is essential for the pile of laundry to first be separated, in order to be able to individually capture and, if necessary, to sort each item of laundry.

In laundries, it may also be necessary for items of laundry which have already been separated to be individually captured or grabbed in order to feed them to a further treatment step. If, for example, the items of laundry are passed to clamps of a transportation conveyor in a next step, it is advantageous when the items of laundry are equally captured such that they can be passed directly to the clamps of the transportation conveyor.

Methods in which individual items of laundry are captured or picked out of a pile of laundry or in which items of laundry which have already been separated have to be captured or grabbed from a pile of laundry are already known. However, it has been found in these known methods that several items of laundry are often picked out at the same time. In addition, in the known methods, it is possible that the item of laundry may not be captured at all on account of a point of the item of laundry which was targeted by the grabbing means being unfavourable. In the cases in which several items of laundry are grabbed or no item of laundry at all is grabbed, the items of laundry incorrectly continue to be treated or movement of the capturing means is carried out without an item of laundry being moved. Reliable and economical separation of the items of laundry cannot be achieved in this way. This results in drops in performance.

BRIEF SUMMARY OF THE INVENTION

Taking the above as a starting point, the invention is based on the object of providing a method for capturing an item of laundry in a reliable and efficient manner.

One method for achieving this object is a method for capturing an item of laundry, wherein a point of the item of laundry is grabbed or drawn by suction by a capturing means and is transported away by the capturing means, characterized in that the topography of the item of laundry is ascertained, at least one point at which the item of laundry is intended to be captured and/or preferably can be captured by the capturing means is ascertained on the basis of the topography, the capturing means is moved to the point in a specifically controlled manner, and the item of laundry is captured by the capturing means. It is possible for only one item of laundry to always be reliably captured and/or for the item of laundry to be grabbed at the intended point or to be captured in some other way by virtue of the topography of the item of laundry being ascertained and at least one point of the item of laundry at which the item of laundry is intended to be captured and/or preferably can be captured by a capturing means being ascertained on the basis of this topography and the capturing means being moved to the point in a specifically controlled manner and the item of laundry being captured by the capturing means. In this case, the topography of the item of laundry is given by the entire top surface area or bottom surface area and the border regions of the item of laundry.

Since the items of laundry are in an arbitrary state or a randomly crumpled state after washing, the topography of the said items of laundry is also arbitrary; therefore, an infinite number of forms can be assumed. According to the invention, it is possible to prespecify the point of the item of laundry at which the said item of laundry is intended to be captured. However, provision is equally also made for at least one point at which the item of laundry can actually be grabbed to be ascertained.

The invention further makes provision for the topography of the item of laundry to be created by an image-forming measure, preferably a three-dimensional image-generating measure, in particular by a 3D camera or a laser scanner. In this case, the item of laundry can be situated on an arbitrary support, for example on a conveyor which feeds the item of laundry to the capturing means.

The topography of the item of laundry is determined where the item of laundry is also intended to be captured. The topography of the item of laundry can be determined by a conventional camera or digital camera which can be read by a computer and which creates a conventional two-dimensional image or photograph of the item of laundry. The third spatial dimension of the photograph can be determined on the basis of the information from the two-dimensional photograph and a scale by virtue of additional depth information, for example distance measurements, of the photograph of the item of laundry provided by the scale which is attached to the item of laundry or to the support. On the basis of this information, the topography of the item of laundry can be determined by means of a computer, and a set of three coordinates X, Y, Z can be assigned to each point of the item of laundry. The topography or a vertical profile of the item of laundry can be calculated in a computer-assisted manner by virtue of these coordinates. This vertical profile can be used to ascertain which region of the item of laundry is particularly advantageous for capturing purposes and/or which points of the item of laundry are particularly suitable for capturing purposes on the basis of the ascertained topography.

As an alternative, 3D cameras can also be used to create the topography or the vertical profile of the item of laundry, in order to provide the viewer with a spatial impression of the item of laundry. It is possible to ascertain the distances of all the points of the item of laundry from one another, in particular the coordinates X, Y, Z for each point of the item of laundry, by displaying the item of laundry using a 3D camera. A 3D camera of this kind may be a stereo camera in which the item of laundry is recorded from different viewing angles at the same time by at least two cameras. The distance between two camera lenses in this case usually corresponds to the distance of the human eyes. The resulting pair of images is again presented to the eyes of the viewer separately, as a result of which a spatial impression is produced.

For the present purpose, the images are processed in a computer and in this way the distances between the points on the item of laundry or the coordinates and the height of the said points in relation to a reference height are directly determined.

A further possible way of recording a three-dimensional image is triangulation. In a triangulation system, a light source casts a defined pattern onto the item of laundry. This pattern is distorted on the surface of the crumpled item of laundry. Two cameras record this distorted pattern from two different viewing angles and the topography or the vertical profile of the item of laundry is determined from the distortion of the pattern by means of a computer.

The topography of the item of laundry can also be determined by means of a laser scanner. Laser scanning involves surfaces being scanned by means of a laser beam in a line or grid. During scanning, the laser beam and the surface are recorded by a camera. As a result of the surface being scanned by a laser beam in this way, the surface is measured and this measurement data is used to create a very accurate image of this surface. A laser scanner of this kind comprises a scanning head and a driver or drive electronics system. The electronics system comprises a power-electronics part, which supplies the currents for the drives, and comprises scanner software, for example, on a computer or scanner software embedded into a system, the said scanner software corresponding to the driver electronics system. In the scanning head, the laser beam is deflected such that it continuously captures the entire surface of the object which is to be scanned. Several laser beams or a fan of laser beams can also be used. The laser beam is deflected, for example, by changing the orientation of a mirror in the scanning head (mirror scanner).

For the purpose of three-dimensional laser scanning, the scanning head also has, in addition to the two mirrors for the X and Y axes, an adjustable optical system for the depth, that is to say the Z axis. As a result, it is possible for the laser to also target a third dimension.

A further possible way of creating a three-dimensional image of the item of laundry involves the use of a 3D rig. In this 3D rig, two cameras are connected to form a 3D camera system in order to take stereoscopic 3D photographs.

According to a preferred further development of the invention, provision is made for a region of the item of laundry with a very large curvature, a bend, a fold, an edge and/or a corner of the item of laundry to be determined as the point at which the item of laundry is preferably captured. Therefore, the regions in which two adjacent points have tangents which form an acute or extremely acute angle are preferred. In this case, the distance between these two adjacent points can be selected in an arbitrary manner. The curvature of the region or the angle between two tangents is ascertained on the basis of the information which was determined by one of the abovementioned image-forming measures.

It is also feasible for a bend, a fold, an edge and/or a corner of the item of laundry to be specifically sought on the basis of the created topography of the item of laundry, in order to grab the said bend, fold, edge and/or corner. During this process of seeking specific regions of the item of laundry, the recorded images are automatically compared with a library containing images of bends, folds, corners, borders in a computer. As an alternative, a bend or an edge can be determined, for example, by the said bend or edge having a maximum curvature or a minimum curvature radius. The topographies are identified or evaluated in this way very quickly owing to the use of modern digital cameras and computers. In addition to the topography, the color and/or, for example, the type of fabric or patterning of the item of laundry can also be determined by a combination of the laser scanning measures with conventional image-forming camera technology.

A further advantageous development of the present invention is that the item of laundry is captured at a fold or an edge or a corner. After the topography of the item of laundry is determined, the system has knowledge of the overall condition and orientation of the unsorted item of laundry. A decision can be made in respect of the point of the item of laundry at which the said item of laundry is intended to be grabbed on the basis of the said information. Therefore, for example, if more edges or corners than an item of laundry should have are determined, at least one further item of laundry is present. In a case of this kind, the at least two interlinked items of laundry are carried away, once again subjected to the separation process and/or reoriented. The individual items of laundry are then fed to the capturing means once again.

In particular, the invention further makes provision for a preferred point for capturing the item of laundry to be sought from several alternatives. All maxima and minima of the vertical profile are ascertained when determining the topography. This measurement data is evaluated in such a way that, for example, particularly high regions which have a large radius of curvature are preferred and other regions, which are of a more flat configuration, are less preferred. In addition to the regions which are determined in this way, the border regions or corners or folds constitute possible points for capturing the item of laundry.

Provision is further made for at least one such point of the item of laundry which can be grabbed by the capturing means in a particularly expedient or rapid manner to be ascertained. It may be advantageous, particularly for the further treatment of the item of laundry, when the item of laundry is grabbed in a specific way and/or at a specific point. If the item of laundry is fed to a mangle in the next treatment step, it could be advantageous when the item of laundry is grabbed at a corner or a border region or edge. If the picked-up items of laundry are merely sorted in the next treatment step, it does not matter how the items of laundry are picked up or at which point the items of laundry are picked up.

As a further particularly advantageous refinement of the present invention, provision is made for the spatial orientation of the capturing means to be accordingly matched to the point of the item of laundry which is to be grabbed. If a point is particularly well suited for capturing the item of laundry, in particular for the further treatment of the item of laundry, the capturing means can be rotated out of its initial orientation and moved such that it can capture the said point. To this end, provision is made for the capturing means to have associated articulated joints about which the capturing means is moved.

In particular, provision is made for the item of laundry to be captured by a capturing means which is in the form of a grabber or suction device. In the case of the grabber, provision is made for the item of laundry to be captured by at least two grabbing elements. If the capturing means is configured as a suction device, the item of laundry is drawn in by a vacuum, which forms in an end region of the suction device, and held until the vacuum falls with respect to atmospheric pressure.

The invention preferably makes provision for the position of each point of the item of laundry in space or the distance of the said point, in particular in relation to the capturing means, to be determined, and for the points at which the item of laundry can be grabbed to be ascertained on the basis of the position. In this case, the information about the topography of the item of laundry is processed in such a way that the capturing means can target any desired point of the item of laundry in a specific and automated manner. The capturing means receives the coordinates of those points which are particularly advantageous for capturing the item of laundry, which points are ascertained from determining the topography, by means of the control electronics system. After the item of laundry is captured and the said item of laundry is deposited in accordance with the further treatment, the coordinates of the item of laundry which is to be captured next are transmitted to the capturing means, and therefore the capturing means does not have any downtimes. However, it is also feasible for the capturing means to be returned to a starting position after the item of laundry is discharged.

Provision is further preferably made for interfering influences, such as the image background for example, to be filtered out, preferably optically filtered out, by the image-forming measures. In image-forming processing methods, it is often found to be problematical that the area surrounding the object which is to be picked up emits interference information of the kind that adversely affects the recording of images of the said object. By virtue of the image-forming measure being focused on the region of the item of laundry, all environmental influences are blanked out. Particularly owing to the measures of laser scanning, only information from the item of laundry is used for determining the topography.

A particularly advantageous development of the present invention has been found to be that an item of laundry for which no capturing point can be determined is conveyed away and/or reoriented and then the topography of the same item of laundry is ascertained. In some cases, the item of laundry can be oriented on the support or the conveyor in such a way that no marked point can be identified by the image-forming measures. In order that an event of this kind does not bring the entire method to a stop, the item of laundry is simply moved on, possibly reoriented and then fed for the purpose of determining the topography once again. If an event of this kind occurs several times in succession for the same item of laundry, the said item of laundry can be entirely removed from the process.

According to the invention, provision is made for in each case only one single item of laundry to be picked up by the capturing means. On account of the point at which the item of laundry is captured being determined before the item of laundry is captured by the capturing means, it is virtually impossible for two parts or more to be captured by the capturing means. Instead, provision is made for precisely only one single item of laundry to be captured by the capturing means and, if appropriate, to already be turned or rotated by the capturing means for further treatment of the item of laundry in such a way that it can be fed directly to the next treatment step. If no item of laundry is captured by the capturing means, this step is either carried out once again, or the item of laundry is conveyed away without being captured.

A further way of achieving the abovementioned object, which object may also be an advantageous further development of the above-described method, is a method for capturing an item of laundry, wherein a point of the item of laundry is grabbed or drawn by suction by a capturing means and is transported away by the capturing means, characterized in that the topography of the item of laundry is ascertained, and the item of laundry is fed to corresponding further treatment apparatuses by the capturing means on the basis of the topography. According to the said measure, provision is made for the topography of the item of laundry to be ascertained, and for the item of laundry to be fed to a corresponding further treatment apparatus by the capturing means on the basis of the topography. A further treatment apparatus of this kind may be, for example, a mangle, a further conveyor, a sorting container or the like.

Provision is further made for properties of the item of laundry, such as the size or shape for example, to be able to be ascertained on the basis of the ascertained topography. Provision is also made for the topography to be ascertained by image-forming measures, and for properties of the item of laundry, such as color or type of fabric for example, to be ascertained by conventional digital cameras. Appropriate assignment for the further treatment of the item of laundry is possible by ascertaining these properties. In particular, sorting of the item of laundry in accordance with the properties is possible in this way.

According to the invention, provision is further made for the weight of the captured item of laundry to be determined by the capturing means. To this end, the capturing means itself or the fastening means of the said capturing means has a set of scales which is preferably electronically read.

A further way of achieving the abovementioned object, wherein the said object may also be an advantageous further development of the above-described method, is a method for capturing an item of laundry, wherein a point of the item of laundry is grabbed or drawn by suction by a capturing means and is transported away by the capturing means, characterized in that the pile of laundry is specifically separated by the capturing means capturing an item of laundry. Accordingly, provision is made for the pile of laundry to be specifically separated by the capturing means capturing an item of laundry. After the items of laundry leave the washing machine, they usually further form a pile of laundry containing loose, interlinked items of laundry. The capturing means can specifically capture an item of laundry, which protrudes from the pile of laundry by way of one region for example, in this way and then pull it out of the pile of laundry. In this way, the individual items of laundry in the pile of laundry can be gradually separated without the pile of laundry as a whole having to be separated out before capturing the individual item of laundry.

BRIEF SUMMARY OF THE DRAWINGS

A preferred exemplary embodiment of the invention will be explained in greater detail below with reference to the drawing, in which.

DETAILED DESCRIPTION OF PREFERRED EMBODIMENTS

The figures in the drawing show a method in which individual items of laundry are captured from a pile of laundry arriving, for example, from a washing machine. The captured item of laundry is then fed to a further treatment step depending on its properties.

Figure 1:
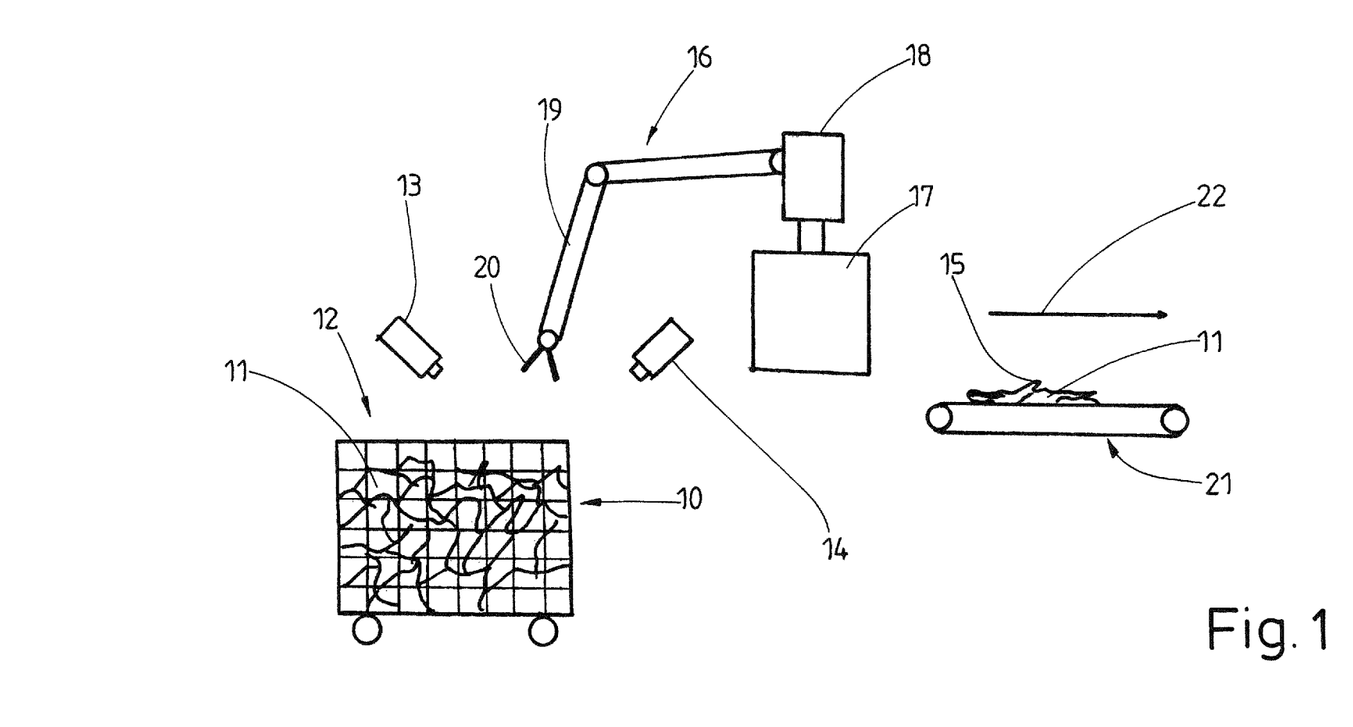
FIG. 1 shows a grabber capturing an item of laundry in order to be separated.

Washed laundry from a washing machine is often temporarily stored in a laundry cart 10 before further treatment. However, items 11 of laundry which are first collected before being washed can also be collected or stored in a laundry cart 10 of this kind. Therefore, a laundry cart 10 can contain dirty items 11 of laundry or washed items 11 of laundry. The items 11 of laundry form a pile 12 of laundry in the laundry cart 10. Particularly after the wet items 11 of laundry are washed and then subjected to a water-removal process, the said items of laundry are intertwined with one another to form a pile 12 of laundry. In piles 12 of laundry of this kind, individual items 11 of laundry are further difficult to identify and to separate from one another. Rather, the individual items 11 of laundry form a seemingly interlinked pile 12 of laundry (FIG. 1). The individual items 11 of laundry have to be separated for the further treatment of the items 11 of laundry, such as for mangling for example. A capturing means reaches into the pile 12 of laundry during the separation process. In the process, several items of laundry or even no items of laundry may be grabbed instead of one item 11 of laundry.

The invention makes provision for an image or a photograph of that side of the pile 12 of laundry which faces upward to first be created. This image is preferably a three-dimensional image. Since this three-dimensional image extends in three dimensions or spatial directions, specifically in an X-direction, a Y-direction and a Z-direction, both the heights and also the depths, in particular any shape, which are formed by the randomly mixed-up items 11 of laundry can be identified. This three-dimensional image of the item 11 of laundry can therefore also be called a topography of the items 11 of laundry.

Two cameras 13, 14 are provided in the exemplary embodiment illustrated in FIG. 1 in order to determine a three-dimensional image of this kind or the topography of the items 11 of laundry. The positioning of the cameras 13, 14 above the pile 12 of laundry, in particular the distance of the said cameras, is only symbolically illustrated here and can rather be matched to meet the recording conditions. In the method, illustrated in FIG. 1, for recording the topography of the items 11 of laundry, a stereoscopic measure is applied by means of the cameras 13, 14. During the stereoscopy process, an object, here the items 11 of laundry, is viewed or recorded from two different viewing angles by at least two cameras. An image of three-dimensional appearance can be created or all three spatial coordinates can be determined by an object being specially recorded from two different viewing angles by means of two cameras in this way. In order to determine the three-dimensional coordinates X, Y, Z of each point on the surface of the items 11 of laundry, the images or information recorded by the cameras 13 and 14 are/is further processed by a computer, not illustrated.

It is also feasible for the images of the items of laundry from three, four or more cameras, which create images of the items 11 of laundry at the same time, to be evaluated by a computer. Recording by the cameras of the items 11 of laundry for determining the topography of the items 11 of laundry may involve continuous recording or stroboscopic taking of photographs, for example at one-second intervals.

Once the computer has determined the topography of all of the visible items 11 of laundry contained in the pile 12 of laundry, points 15 on the items 11 of laundry, which points are particularly suitable for capturing or separating the laundry, are ascertained. Points 15 which are particularly suitable for separation purposes are those at which an item 11 of laundry can be captured and can be pulled out of the pile 12 of laundry without a great deal of resistance. Regions of the item 11 of laundry which have a small radius of curvature or a large curvature, such as a fold, a bend, an edge or a corner for example, are particularly suitable as points 15 of the said kind. In order to determine points 15 of this kind, the topography is evaluated, for example by the computer, in such a way that the angle between two tangents or tangential planes of in each case two adjacent points is ascertained from the said points. If this angle is, for example, flat, the item 11 of laundry has a large radius of curvature at this point 15. If, on the other hand, the said angle is acute or the tangents do not intersect at all, a small radius of curvature can be assumed. Points 15 of this kind are particularly suitable for capturing an item 11 of laundry.

As soon as a suitable point 15 on an item 11 of laundry, which point has been found to be particularly suitable for capturing the item 11 of laundry, has been ascertained, the item 11 of laundry is captured by the capturing means at this point 15. The capturing means illustrated in FIG. 1 is a grabber 16. However, as an alternative, the said capturing means may also be a suction device or a similar capturing means. The grabber 16 illustrated in FIG. 1 has a base 17 on which a grabber head 18 is located in a rotatable manner. A grabber arm 19 which comprises a plurality of elements, which are connected by articulated joints, extends from the grabber head 18. A tongs-like clamp 20 is located at the end of the grabber arm 19. This clamp 20 can be automatically opened and closed in a computer-controlled manner. The clamp 20 is closed in order to capture an item 11 of laundry. The clamp 20 is opened again in order to release the item 11 of laundry. In interaction with the grabber head 18, the grabber arm 19 is flexible in such a way that the grabber 16 can target any desired point in its range by way of its clamp 20. The clamp 20 is closed in order to capture the item 11 of laundry. At the end of the grabber arm 19, the clamp 20 can be moved in such a way that it can grab in virtually all directions.

If a point 15 of the item 11 of laundry which is particularly well-suited for capturing the item 11 of laundry has been ascertained, the coordinates of the point 15 are transmitted to the grabber 16 so that the clamp 20 of the grabber 16 is moved precisely to the point 15 of the item 11 of laundry. The grabber 16 illustrated in FIG. 1 is merely an exemplary embodiment. The grabber 16 can also assume any other desired, feasible form.

A plurality of points 15 which are particularly well-suited for capturing the item 11 of laundry can be ascertained by ascertaining the topography of the item 11 of laundry. If a plurality of such points 15 are ascertained, evaluation in respect of which point 15 is most suitable takes place. In addition, provision is made for special points 15, such as an edge or a corner of an item 11 of laundry for example, to be identified as such. For this identification process, the computer system can have a library containing a large number of captured corners or edges with which the recorded image is compared. In some further treatment steps, it is necessary for the item 11 of laundry to be captured at the corner or at an edge. This information can be transmitted to the grabber 16 by means of the computer.

After the item 11 of laundry has been captured by the grabber 16, the said item of laundry is pulled out of the pile 12 of laundry and fed to a conveyor 21. The separated item 11 of laundry is transported away in treatment direction 22 on the said conveyor 21.

Figure 2:
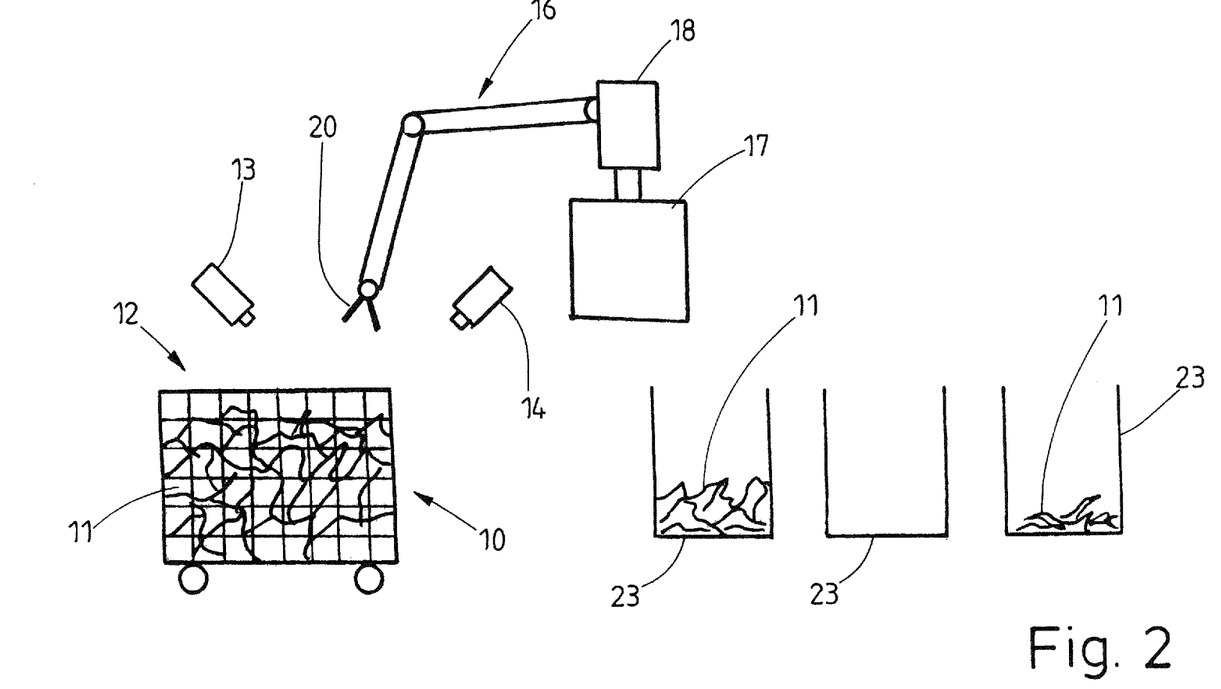
FIG. 2 shows the grabber capturing an item of laundry in order to be sorted.

When the three-dimensional image of the item 11 of laundry is created by the cameras 13, 14 or when the topography of the item 11 of laundry is determined, both the three-dimensional coordinates of each point on the item 11 of laundry are determined and also conventional images of the item 11 of laundry are recorded by the cameras 13 and/or 14. These recorded images allow the individual item 11 of laundry to be identified and, respectively, allow the properties of the said item of laundry, such as size, color, type of fabric or else the degree of soiling for example, to be determined. The further treatment of an item of laundry often depends on these properties. For example, items 11 of laundry which are of the same color or of the same type of fabric are subjected to a common treatment process. In order to further treat several items 11 of laundry, which have the same properties or sorting criteria, together, the said items of laundry are initially correspondingly collected. The properties of the item 11 of laundry can be ascertained either when the item 11 of laundry is still in the pile 12 of laundry or when the item 11 of laundry has already been captured by the grabber 16. After the item 11 of laundry is captured by the grabber 16, the said grabber sorts the item 11 of laundry into containers 23. A separate container 23 or sorting container is provided for each property or for each sorting criterion for the items of laundry. When a certain number of items of laundry are contained in a container 23 of this kind, the said items of laundry are fed to a next treatment step.

Provision is further made for the grabbing arm 19 or the clamp 20 of the grabber 16 to have a means for determining the weight of the captured item 11 of laundry. Therefore, it is also possible to sort the items 11 of laundry in accordance with their weight or, if the individual item 11 of laundry has been previously identified by the image-forming method, to determine the degree of moisture in the item 11 of laundry by means of the weight.

Figure 3:
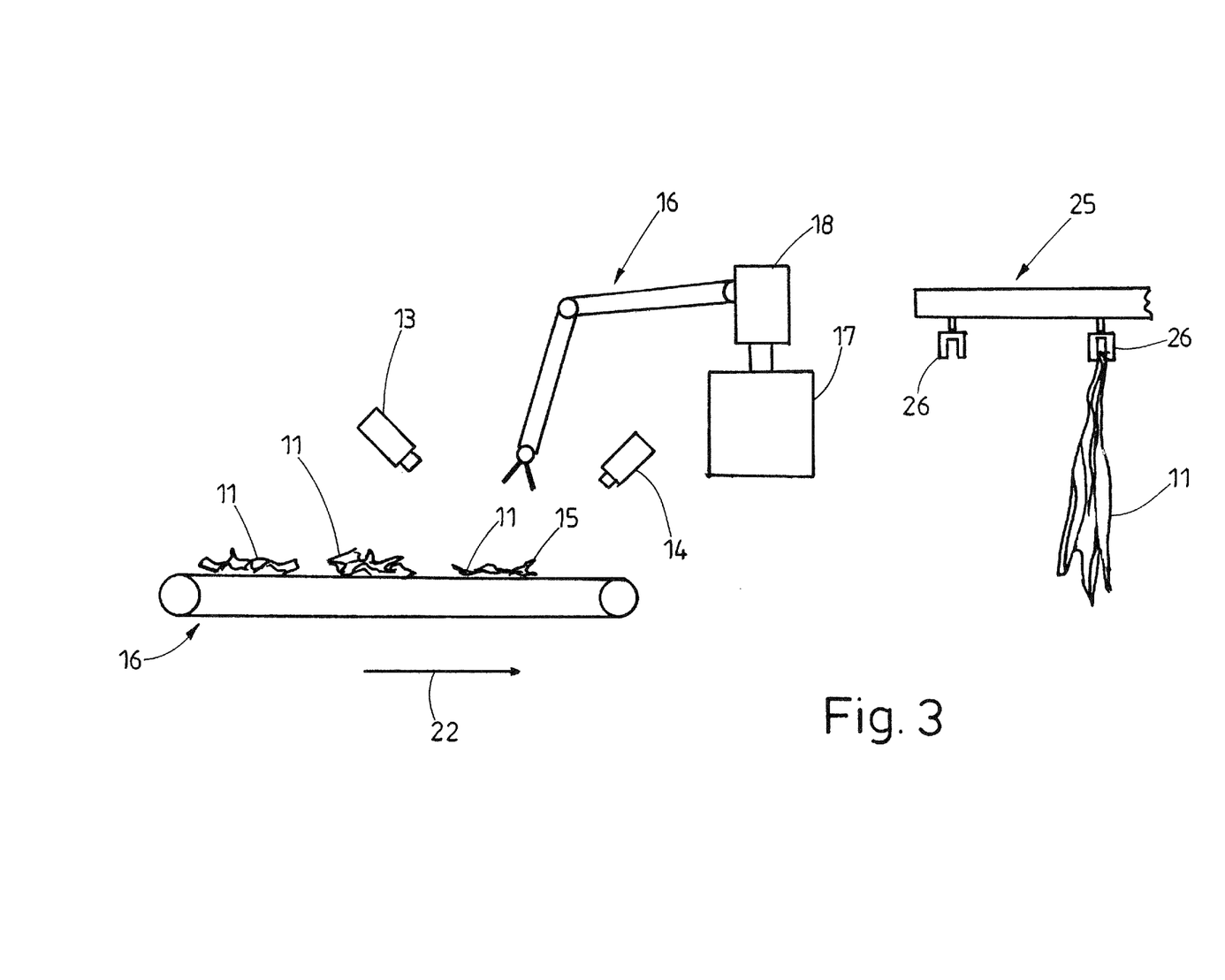
FIG. 3 shows a grabber capturing an item of laundry in order to be further transported overhead.

In a further exemplary embodiment of the present invention, the items 11 of laundry are fed to the grabber 16 in a manner already separated and situated on a conveyor 24. In this case, the topography of the item 11 of laundry is determined by the cameras 13 and 14 as already described, while the item 11 of laundry is situated on the conveyor 24. In order to determine the topography, the conveyor 24 is either briefly stopped or moves continuously. The topography is determined by stereoscopic measures by the cameras 13 and 14 in this exemplary embodiment too.

In a further step for analysing the information, the X, Y and Z coordinates of each point of the item 11 of laundry are determined and preferably ascertained by points 15 for being captured by the grabber 16 (FIG. 3). It is also feasible here for the item 11 of laundry to be captured at one of several possible points 15 for further treatment.

After the item 11 of laundry has been captured by the grabber 16, it can either be fed to a further conveyor 21 or assigned to corresponding containers for sorting purposes in accordance with its properties. In the exemplary embodiment of the present invention illustrated in FIG. 3, the captured item 11 of laundry is passed from the grabber 16 to an overhead conveyor 25. This overhead conveyor 25 has a large number of transportation hooks 26 or clamps to which in each case one item 11 of laundry is passed by the grabber 16. The item 11 of laundry is then conveyed away in a manner suspended from a transportation hook 26. The transportation hooks 26 run in a continuous loop on the overhead conveyor 25 and feed the item 11 of laundry to a further treatment station, not illustrated. In this exemplary embodiment of the present invention, in which the items 11 of laundry can be transported further in a suspended manner, it may be advantageous for the grabber 16 to capture the item 11 of laundry at an edge or a corner immediately. In this way, the item 11 of laundry can be passed to the transportation hooks 26 of the overhead conveyor 25 directly by way of this corner or edge.

Figure 4:
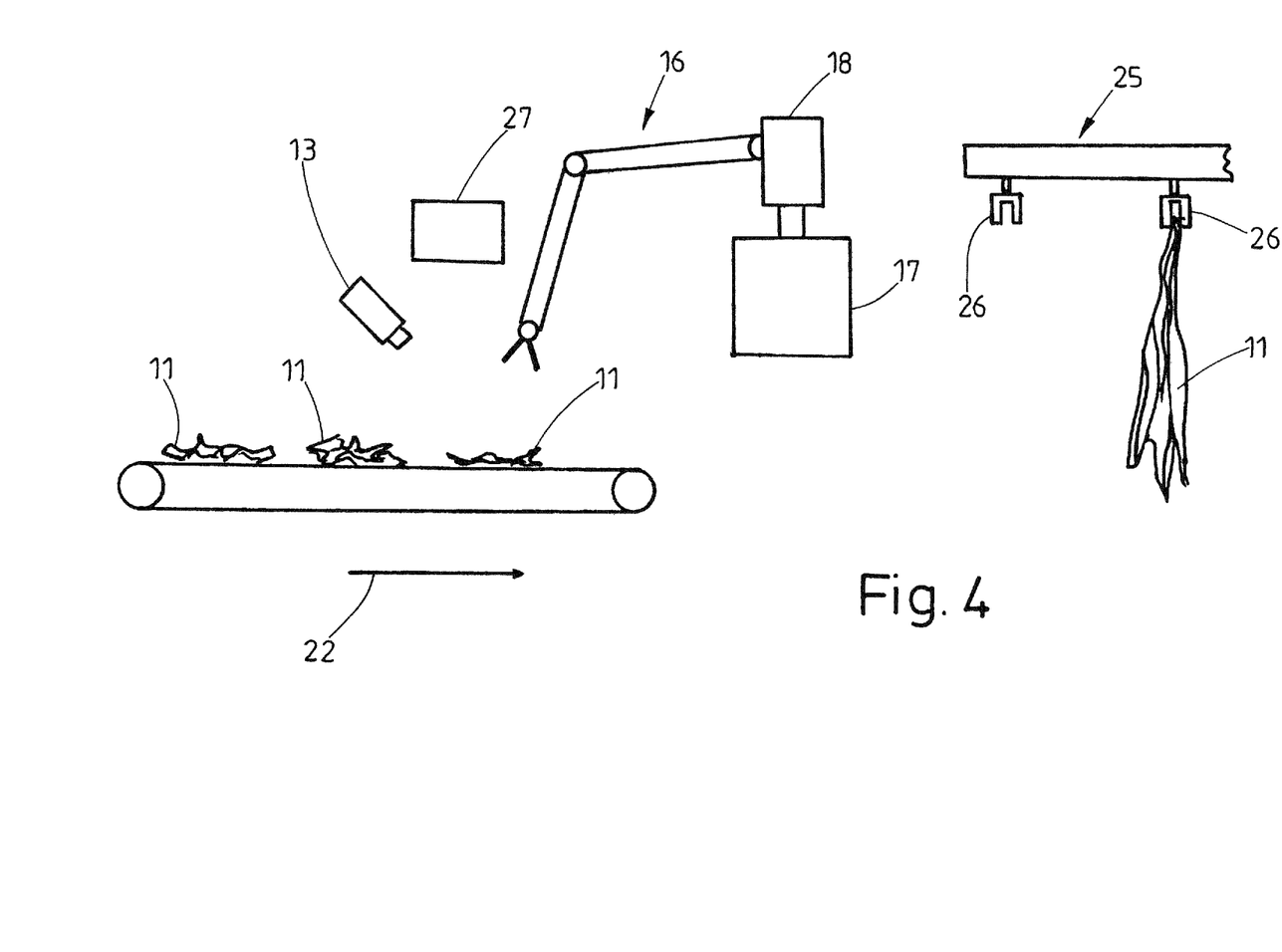
FIG. 4 shows a laser scanner ascertaining the topography of an item of laundry.

In addition to the stereoscopic measure in which a three-dimensional image or the topography of the item 11 of laundry is created by means of two cameras 13 and 14, it is also feasible for laser scanning measures to be used (FIG. 4). In this case, in a manner exactly as described above, a separated item 11 of laundry is fed to the grabber 16 on a conveyor 24. The item 11 of laundry is then subjected to the action of a laser beam by a scanning head 27. This laser beam is moved over the entire item 11 of laundry, or the item 11 of laundry is moved longitudinally beneath the laser beam. It is also feasible for an entire fan of laser beams, rather than a single laser beam, to be directed onto the item 11 of laundry. The topography of the item of laundry can be ascertained by virtue of the distortion of the straight laser beam on the crumpled item of laundry. To this end, the item 11 of laundry is recorded by a camera 13 and this data is fed to a computer, not illustrated, which reconstructs the topography of the item 11 of laundry from the information provided by the distorted laser beam on the item of laundry.

In addition to the topography, other properties, such as color and type of fabric, can also be ascertained by the cameras 13 with these measures as well. The method steps which follow the determination of the topography are identical to those described above. Therefore, ascertaining the topography by means of laser scanning can also be applied to the method steps of separating, sorting or moving on the item 11 of laundry.

In addition to the above-described measures of stereoscopy and laser scanning, still further techniques for creating a three-dimensional image of an individual item of laundry or topography for the claimed method are also feasible.

LIST OF REFERENCE SYMBOLS

10 Laundry cart
11 Item of laundry
12 Pile of laundry
13 Camera
14 Camera
15 Point
16 Grabber
17 Base
18 Grabber head
19 Grabber arm
20 Clamp
21 Conveyor
22 Treatment direction
23 Container
24 Conveyor
25 Overhead conveyor
26 Transportation hook
27 Scanning head

What is claimed is:
1. A method for capturing an item (11) of laundry, wherein the item (11) of laundry is grabbed or drawn by suction by a capturing means and is transported away by the capturing means, comprising:
ascertaining topography of the item (11) of laundry and creating an image of the topography of the item (11) of laundry using a three-dimensional image-generating, image-forming measure;

ascertaining at least one point (15) at which the item (11) of laundry is intended to be captured and/or can be captured by the capturing means on the basis of the topography;

selecting the at least one point (15) for capturing the item (11) of laundry from several alternatives selected from the group consisting of a region of the item (11) of laundry with a curvature, a region of the item (11) of laundry with a bend, a region of the item (11) of laundry with a fold, a region of the item (11) of laundry with an edge, and a region of the item (11) of laundry with in which tangents of two adjacent points on the item (11) of laundry form an extremely acute angle;

ascertaining the at least one point (15) of the item (11) of laundry from the several alternatives as a capturing point that can be grabbed by the capturing means in an expedient or rapid manner;

moving the capturing means to the at least one point (15) in a specifically controlled manner; and capturing the item (11) of laundry with the capturing means.

2. The method according to claim 1, wherein the three-dimensional image-generating, image-forming measure is selected from the group consisting of a 3D camera (13, 14) and a laser scanner.

3. The method according to claim 1, wherein the item (11) of laundry is captured at a fold or an edge or a corner of the item (11) of laundry.

4. The method according to claim 1, further comprising matching a spatial orientation of the capturing means to the at least one point (15) of the item (11) of laundry which is to be grabbed.

5. The method according to claim 1, wherein the capturing means is a grabber (16) or a suction device.

6. The method according to claim 1, further comprising determining the position of each point of the item (11) of laundry in space, or the distance of the said point in relation to the position of the capturing means, ascertaining the at least one point (15) at which the item (11) of laundry can be grabbed based on such position or distance.

7. The method according to claim 1, wherein interfering influences are filtered out by the image-forming measures.

8. The method according to claim 1, further comprising determining whether the item (11) of laundry has no capturing point (15), conveying away or reorienting the item (11) of laundry that has no capturing point (15), and then ascertaining once again the topography of the item (11) of laundry that has no capturing point (15).

9. The method according to claim 1, wherein only a single one of the item (11) of laundry is picked up by the capturing means.

10. The method according to claim 1, further comprising:
feeding the item (11) of laundry to corresponding further treatment apparatuses by the capturing means on the basis of the topography.

11. The method according to claim 10, wherein properties of the item (11) of laundry are ascertained on the basis of the ascertained topography.

12. The method according to claim 10, further comprising determining the weight of the captured item (11) of laundry using the capturing means.

13. The method according to claim 7, wherein the interfering influences are optically filtered out by the image-forming measures.

14. The method according to claim 7, wherein the interfering influences are an image background.

15. The method according to claim 11, wherein properties of the item (11) of laundry are selected from the group consisting of the size of the item (11) of laundry, the shape of the item (11) of laundry, the color of the of the item (11) of laundry, and the type of fabric from which the item (11) of laundry is made.

16. The method according to claim 1, wherein properties of the item (11) of laundry are ascertained on the basis of the ascertained topography, and wherein the properties of the item (11) of laundry are selected from the group consisting of the size of the item (11) of laundry, the shape of the item (11) of laundry, the color of the of the item (11) of laundry, and the type of fabric from which the item (11) of laundry is made.

17. A method for capturing an item (11) of laundry from a pile (12) of laundry, wherein the item (11) of laundry is grabbed or drawn by suction by a capturing means and is transported away by the capturing means, comprising:

ascertaining topography of the item (11) of laundry and creating an image of the topography of the item (11) of laundry using a three-dimensional image- generating, image-forming measure;

ascertaining at least one point (15) at which the item (11) of laundry is intended to be captured and/or can be captured by the capturing means on the basis of the topography;

selecting the at least one point (15) for capturing the item (11) of laundry from several alternatives selected from the group consisting of a region of the item (11) of laundry with a curvature, a region of the item (11) of laundry with a bend, a region of the item (11) of laundry with a fold, a region of the item (11) of laundry with an edge, and a region of the item (11) of laundry with in which tangents of two adjacent points on the item (11) of laundry form an extremely acute angle;

moving the capturing means to the at least one point (15) in a specifically controlled manner;

capturing the item (11) of laundry with the capturing means; and separating the pile (12) of laundry containing the item (11) of laundry by way of the capturing means capturing the item (11) of laundry.

* * * * *